United States Patent
Diltz

[15] 3,681,748
[45] Aug. 1, 1972

[54] VELOCITY STACK PROCESSING OF SEISMIC DATA

[72] Inventor: Emory E. Diltz, Ponca City, Okla.

[73] Assignee: Continental Oil Company, Ponca City, Okla.

[22] Filed: Oct. 2, 1970

[21] Appl. No.: 77,443

Related U.S. Application Data

[63] Continuation-in-part of Ser. No. 799,155, Feb. 12, 1969.

[52] U.S. Cl.................. 340/15.5 TC, 340/15.5 CC, 340/15.5 DS
[51] Int. Cl. ..............................................G01v 1/28
[58] Field of Search..340/15.5 TC, 15.5 CC, 15.5 DS

[56] References Cited

UNITED STATES PATENTS 3,417,370  12/1968  Brey............................340/15.5

Primary Examiner—Benjamin A. Borchelt
Assistant Examiner—N. Moskowitz
Attorney—Joseph C. Kotarski, Henry W. Huth, Jerome B. Peterson, William J. Miller, David H. Hill and Dunlap, Laney, Hessin and Dougherty

[57] ABSTRACT

A method and apparatus for processing seismic trace data as derived from a geophysical sounding system whereby a plurality of seismic traces representative of spatially consecutive sounding positions is processed in the time-space domain as a plurality of common depth point groupings; thereafter, specific event information is derived from trace information for each common depth point and a plurality of such similar events are limited through predetermined velocity-time patterns to present primary event data in the velocity-time domain.

20 Claims, 16 Drawing Figures

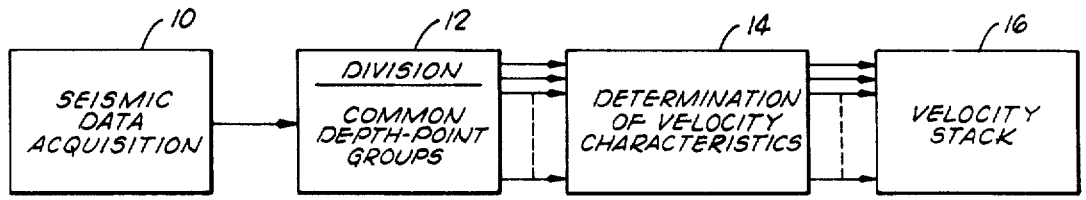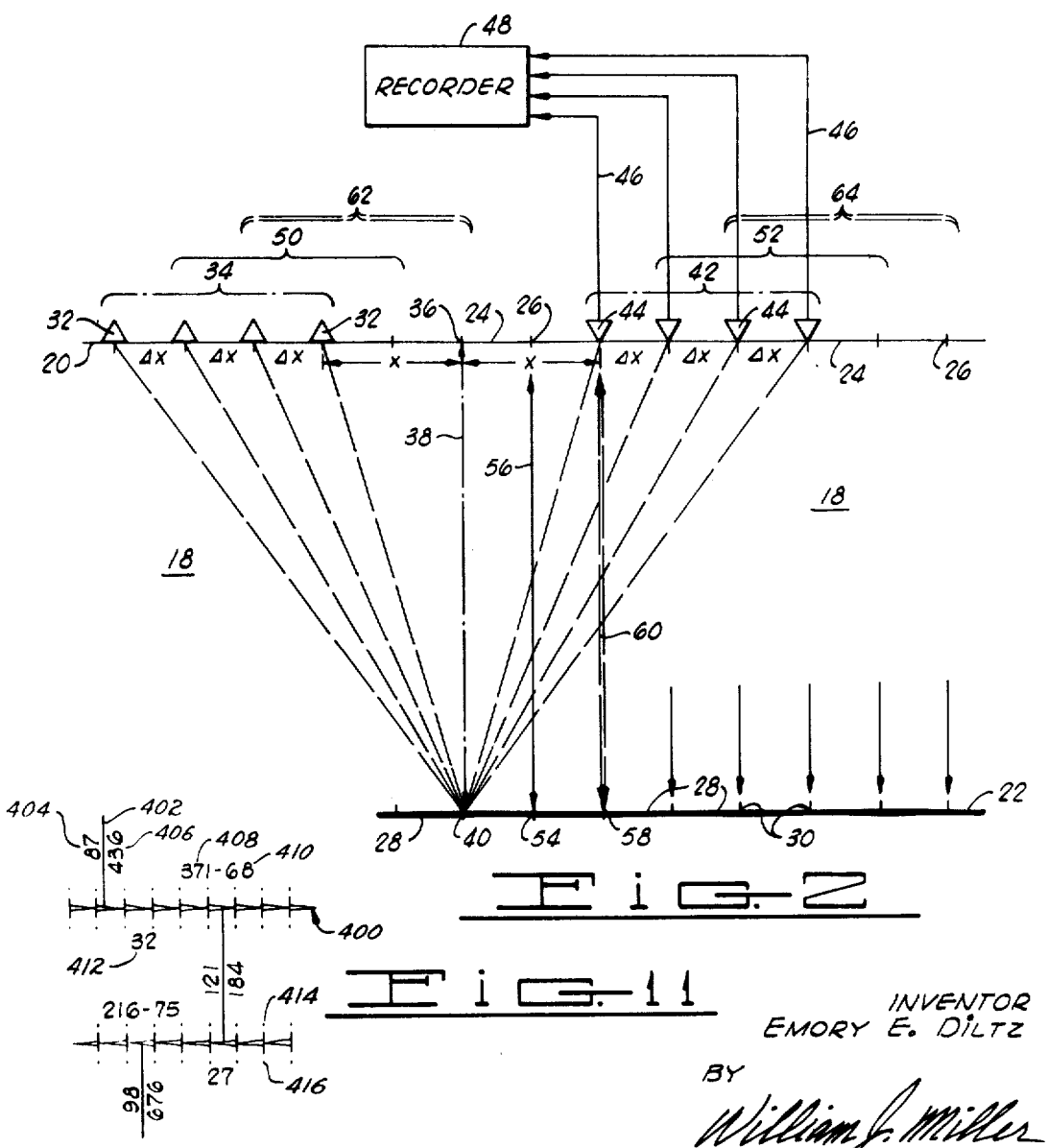

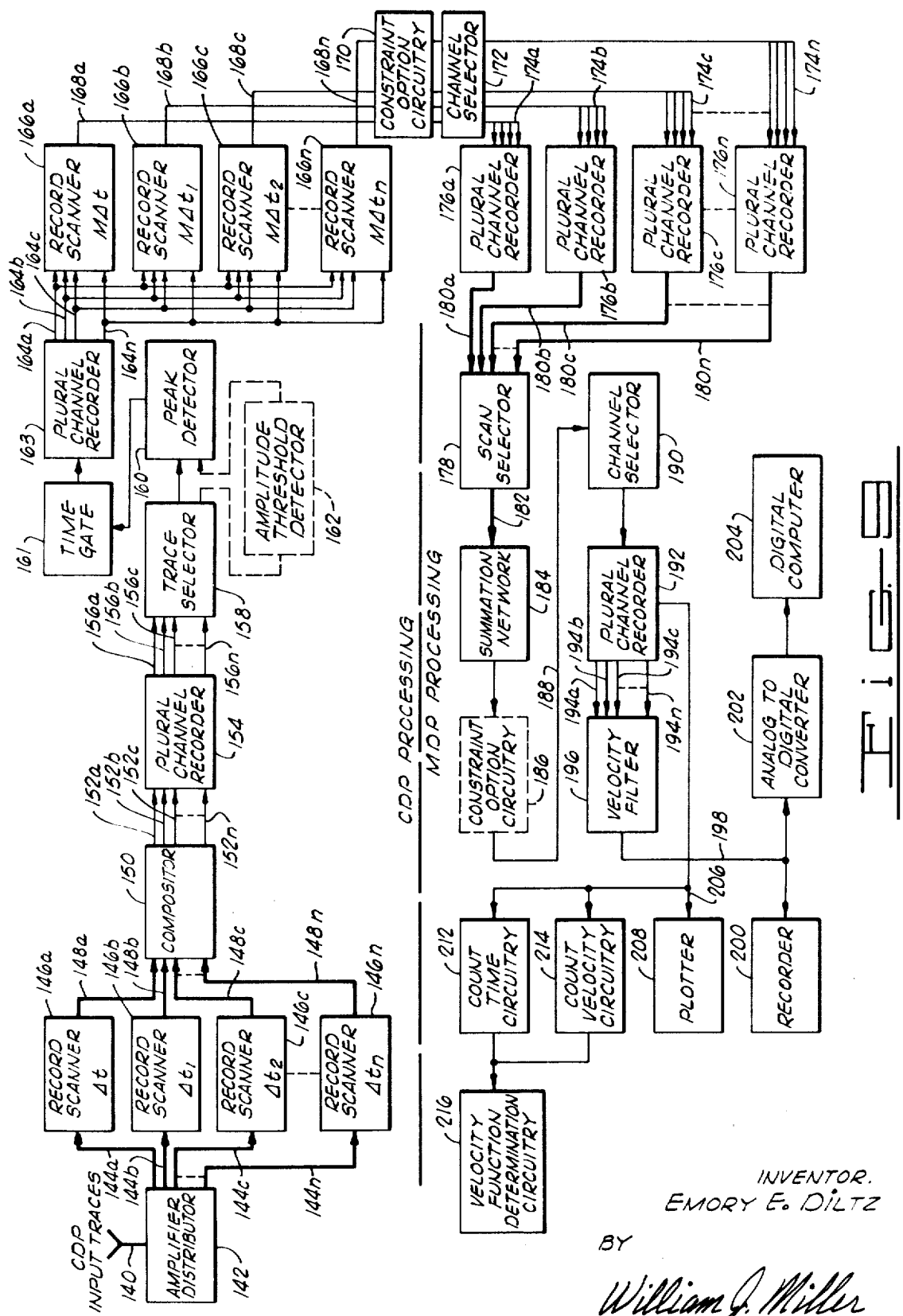

INVENTOR
EMORY E. DILTZ

BY William J. Miller
ATTORNEY

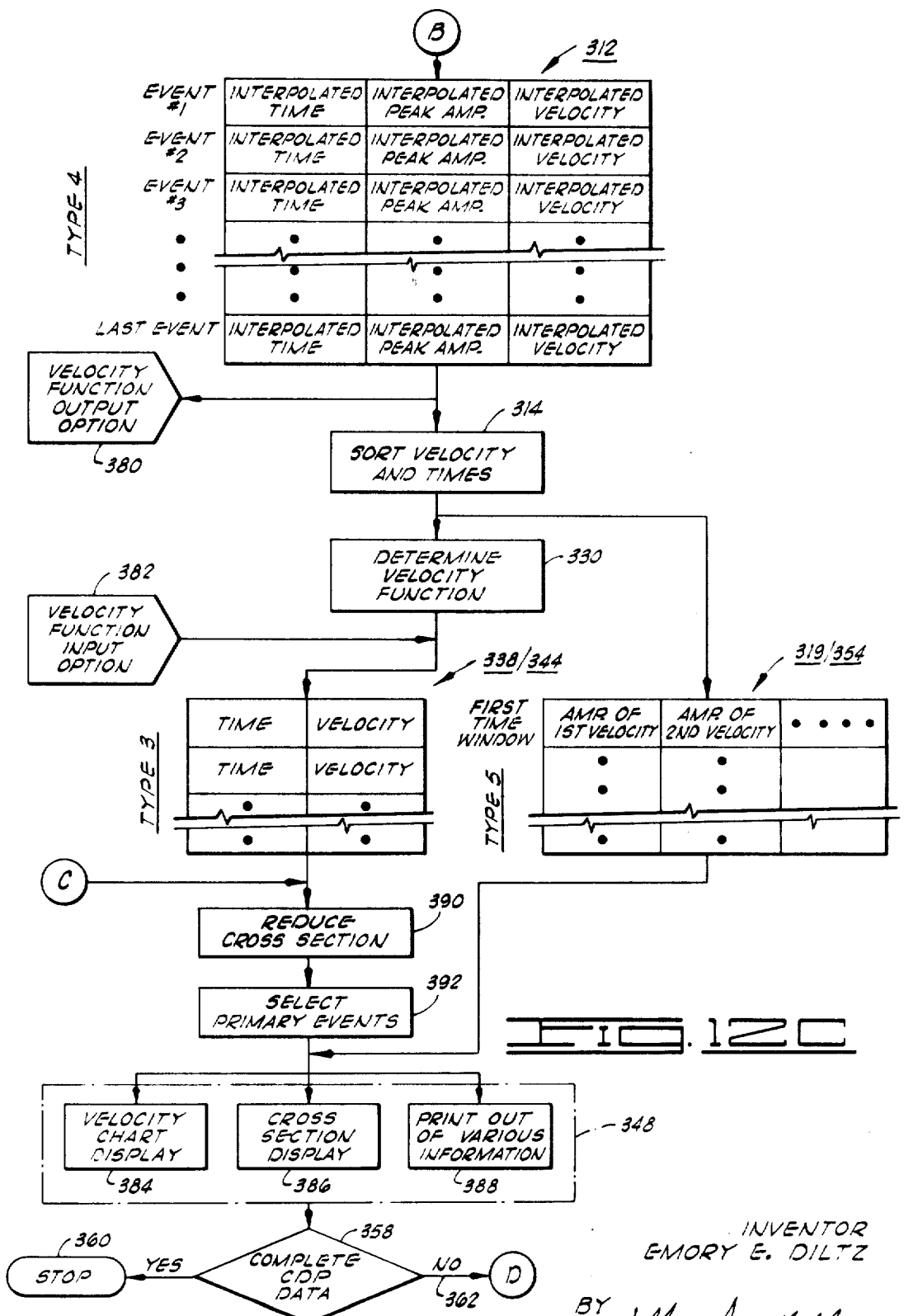

VELOCITY STACK PROCESSING OF SEISMIC DATA

CROSS-REFERENCE TO CO-PENDING APPLICATION

This application is a continuation-in-part of application Ser. No. 799,155 filed in the name of the present inventor on Feb. 12, 1969 and entitled "Velocity Stack Processing of Seismic Data."

BACKGROUND OF THE INVENTION

1. Field of the Invention

This invention relates generally to the processing of seismic data and, more particularly, but not by way of limitation, it relates to an improved method of processing seismic data to extract only selected types of seismic information.

2. Description of the Prior Art

The prior art includes various forms of seismic data processing methods and apparatus and these prior systems are characterized in one aspect by the fact that they seek desired seismic information by attempting to attenuate all other classes of seismic information. Heretofore, a process whereby the desired information is extracted from the overall bulk of the seismic trace has not been successfully developed. Since seismic trace data is highly scrambled and including various forms of information such as primary events, multiple reflections, noise, weathering events, etc., attenuation tape processing can only be made partially effective and it still requires a very high degree of interpretive skill in reading trace data or other of the output forms.

SUMMARY OF THE INVENTION

The present invention contemplates a seismic signal processing method and apparatus for extracting the desired types or classes of seismic return from an overall compilation of seismic data. In a more limited aspect, the invention consists of processing plural groups of common depth point seismic trace information, i.e. as compiled in the time-space parameters, so that certain event information extracted from the common depth point data and represented in time-velocity parameters can be further compiled in a particularly summed or stacked representation which defines the strata structure of the particular subsurface cross-section. The method also carries out a further refinement wherein a time-space representative cross-section is combined at the same time scale with a time-velocity or interval velocity plot of the same cross-section to compile a more meaningful, subsurface cross-sectional representation which includes three parameters, i.e. time, space and velocity.

Therefore, it is an object of the present invention to provide a method of processing seismic information wherein a greater quantity of more definitive information is obtainable.

It is an object of the invention to quantize seismic information in such manner as to gain a more discrete output form.

It is also an object of the present invention to provide a method for processing seismic data wherein seismic events such as primary reflections are detected from their velocity-time patterns.

It is further object of the invention to provide an improvement of the signal-to-noise ratio of detected seismic data by stacking equal velocity responses from multiple basement points.

It is still another object of the invention to provide method and apparatus to determine a best velocity pattern from multiple basement points of a subsurface section for utilization in ascertaining more definitive information for selected common depth point information.

Finally, it is an object of the present invention to provide a seismic data processing method which enables improved detection of primary reflected events, which presents only those events which are velocity constrained to be primary events, which enables the addition of event-to event interval velocity plots, and which can provide a more distinct output, viz discrete impulse form, direct depth sections, displaced depth sections, etc.

Other objects and advantages of the invention will be evident from the following detailed description when read in conjunction with the accompanying drawings which illustrate the invention.

BRIEF DESCRIPTION OF THE DRAWINGS

FIG. 1 represents a process diagram of the present invention;

FIG. 2 is a functional diagram depicting the manner whereby common depth point seismic data is gathered;

FIG. 5 is a representative form of time-velocity plot of event information as derived from a family of seismic traces;

FIG. 9 is a block diagram of seismic processing equipment suitable for carrying out the method of the invention;

FIG. 11 is a representative portion of one form of novel output display which is particularly suited for use in the present invention; and FIGS. 12A, 12B and 12C are successive related parts of a storage array layout diagram as utilized in programmed digital data processing to carry out the present invention.

DETAILED DESCRIPTION OF THE PREFERRED EMBODIMENT

Figure 3:
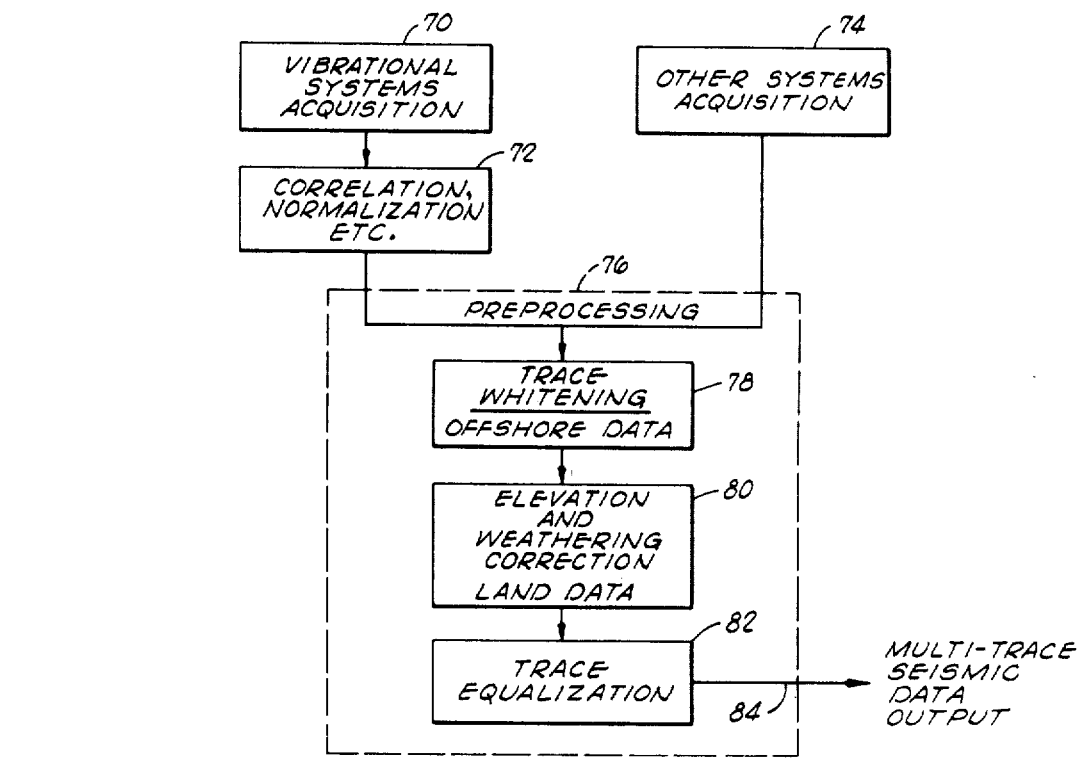
FIG. 3 is a block diagram illustrating various forms of seismic data pre-processing which may be employed.

The invention is set forth most basically in the procedural diagram of FIG. 1. An acquisition step 10 requires the compilation of seismic data in particular form to receive interpretative processing. This is normally in the form of multi-trace seismic data as recorded by a geophone array for a plurality of geophysical soundings. Various types of such sounding systems are quite well-known in the related art. Having derived a plurality of such multi-trace seismic records, a division step 12 would be effected to insure that the over-all total of seismic data traced be divided into a plurality of trace groups, each trace group being representative of information relative to a common depth point, hereafter referred to as CDP, and to be further described below.

A next determination step 14 would process each CDP trace group to determine the appropriate velocity characteristics and the total seismic data for each trace group so that, in effect, the velocity characteristics, etc. are available for representation in the time and velocity parameters, or what is termed the velocity domain. The determination step 14 effects an examination of each CDP trace group to note the time, velocity and amplitude characteristics of each event, i.e., primaries, multiples and noise; and to enable differentiation and isolation of selected types of events, e.g. selection of primary events only. The time-velocity representations from the determination step 14 are then finally processed in the velocity stack step 16 to arrange or assemble a final display output having certain of selected characteristics amplified. The assemblage of such velocity stack information enables the examination of a plurality of seismic traces, which are actually a maze of wiggles or impulse record markings, to extract desired information in discrete form therefrom for representation in a selected recording format. This process is in direct opposition to all prior forms of processing methods which approach the problem of representing desired information, not by extracting the desired record indications, but by attenuating everything which is not wanted. The prior processing systems were inherently indiscriminate causing degradation of selected seismic indication output due to the essential nature of the processing system, i.e., the operation of selective attenuation of energy. The output was a function of chance distribution and relative amplitudes of various energies.

Seismic data acquisition and division of seismic trace information into CDP groupings may be derived from the field acquired data as indicated by FIG. 2. Thus, a section of earth 18 is representative as having a surface 20 and a randomly designated basement strata 22. The earth surface 20 is divided up into a plurality of equal spatial units 24 as divided by index marks 26, and the basement strata 22 is similarly divided into equal spatial units 28 as marked by index marks 30. A plurality of seismic sources 32 are arranged in a predetermined array 34 which is spaced from a center point 36 indicated by a vertical line 38 denoting a common depth point 40 therebelow. An array 42 of seismic receivers or geophones 44 may be spaced by known distances (e.g. $x + \Delta x + 2\Delta x \ldots n\Delta x$) on the other side of center point 36 such that individual elements or sources 32 and geophones 44 of arrays 34 and 42, respectively, are equally spaced from the center point 36; then, all seismic energy traveling in several straight-line paths is reflected from the common depth point 40. While the foregoing is true for continuous marine profiling, land sounding may require variations in successive $x$ distances. Seismic energy received by geophones 44 and transmitted via respective leads 46 to the recorder 48 would be represented as a CDP trace group as the seismic information of each trace can be equated with introduction of a predetermined constant factor.

While source array 34 and receiver array 42 provide surface spacing for compilation of a CDP trace group from common depth point 40 below vertical line 38, it should be readily seen that unitary movement of the surface equipment will provide unitary movement of the common depth sounding point by a proportionate amount. Thus, movement of seismic energy sources 32 to an array position 50 with similar displacement of geophones 44 to a receiver array position 52 will enable recording of a CDP trace group for common depth point 54 beneath vertical line 56. A similar CDP group trace may be compiled for common depth point 58 below vertical line 60 by moving the surface equipment to the source array position 62 and similarly displacing the receiver array position 64. In like manner, the respective seismic source arrays and receiver arrays can be displaced in consecutive manner to obtain any number or surface distance of CDP data groups. A data group may consist of a selected number of traces such as six, ten, twenty or other as dictated by various surrounding signal requirements.

Actually, any number of different types of geophysical prospecting systems may be employed to derive the input trace information. Thus, as shown in FIG. 3, the input seismic trace information may be obtained through a vibrational system acquisition 70, e.g., the use of well-known vibrational prospecting equipment which is patented and widely employed by the present assignee. The received seismic energy from vibrational system acquisition 70 is passed through the attendant correlation, normalizing, etc., steps 72 in well-known manner. On the other hand, initial acquisition may be by other systems acquisition 74, this representing such system energy as electrical arching, pneumatic gun, dynamite, gas guns, etc.

In any event, the acquired seismic trace information is then subjected to the usual preprocessing steps 76 to provide initial cleaning of the trace groups. The preprocessing 76 also includes well-known forms of electronic treating which includes trace whitening 78, which is applicable to marine seismic data required offshore; and it may include elevation and weathering correction 80, generally applicable to land data; and, finally, a stage of trace equalization 82 is applicable to all forms of seismic trace data. The output from trace equalization process 82 may be obtained as a multitrace data output 84 which is ready for introduction into seismic interpretative processing systems. Thus, in the present method, the initial acquisition would be ordered to acquire successively displaced CDP trace groupings, which trace groupings would be successively presented at the output 84 for further processing.

Figure 4:
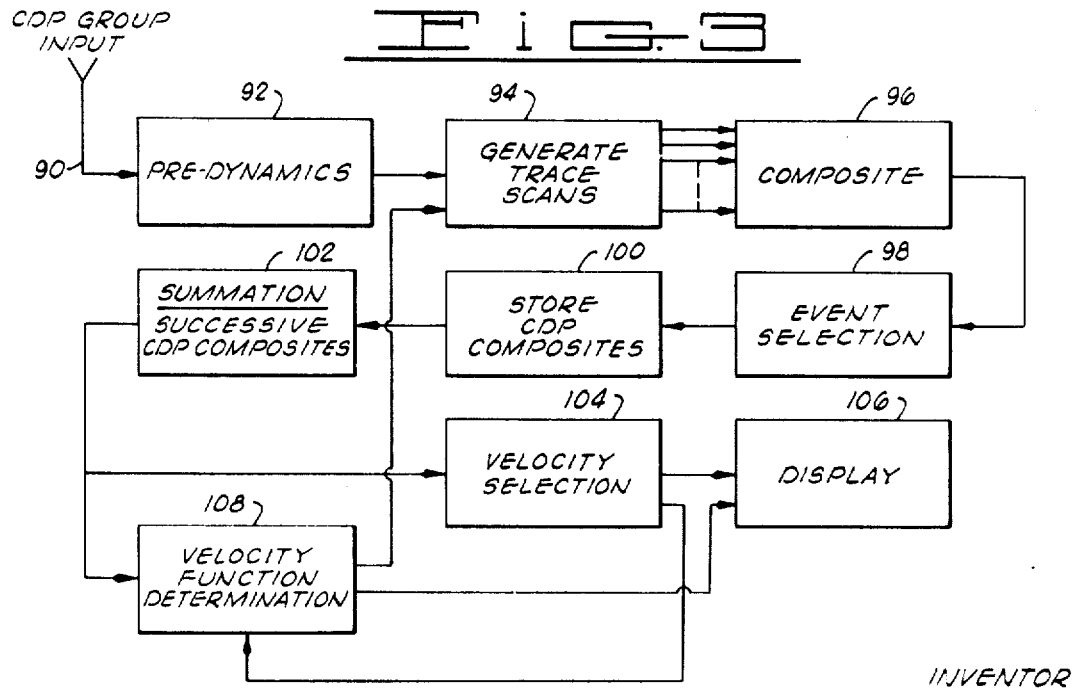
FIG. 4 is a functional block diagram illustrating the primary signal processing steps as carried out in performing the present invention.
Figure 3:
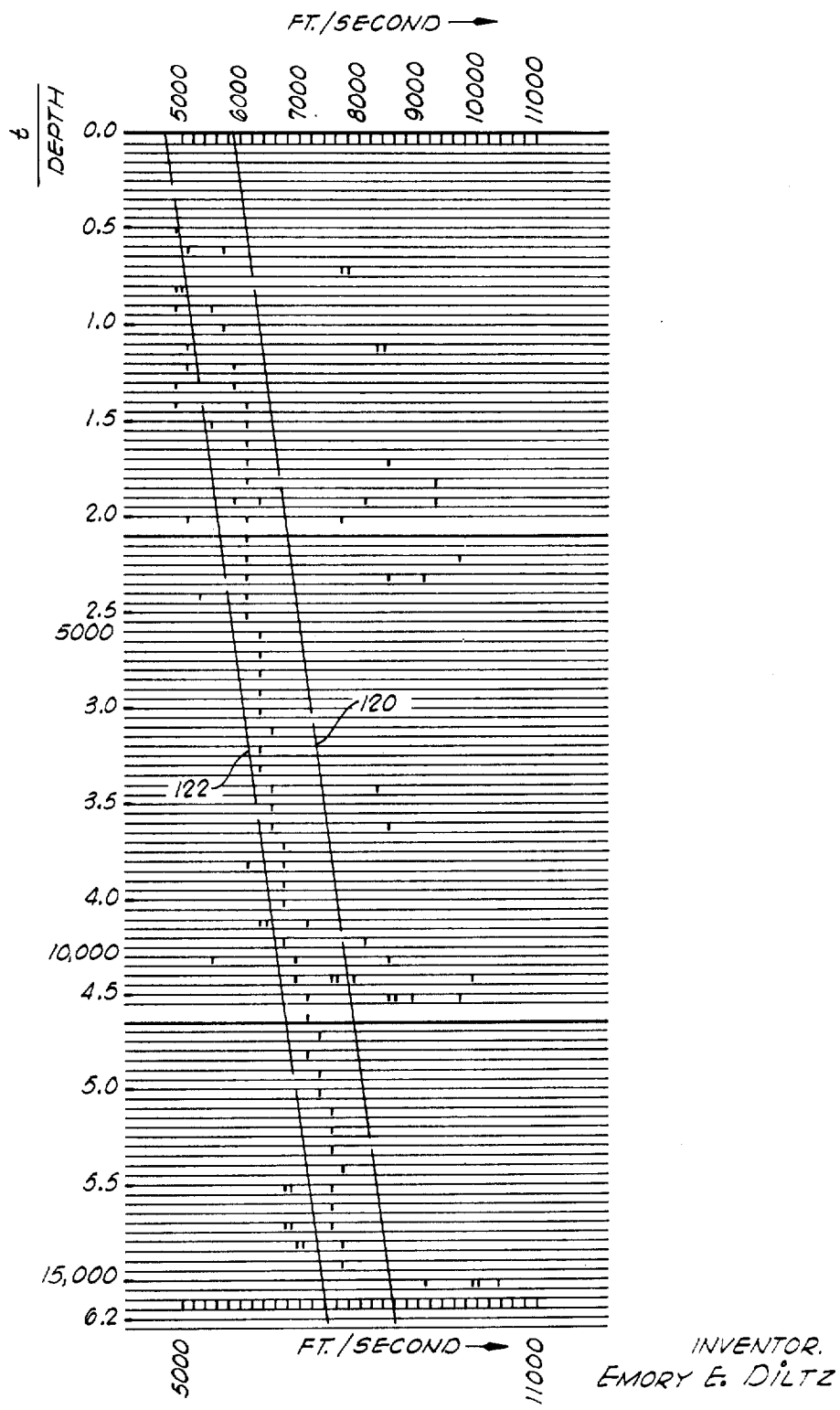

Velocity stack processing is carried out generally by performance of the steps or stages as indicated in FIG. 4. Thus, a plurality of seismic traces relating to a common depth point are applied at CDP group input 90 to a pre-dynamics stage 92 which serves to remove largely the normal move-out time from the trace group. That is, it removes the bulk of the time differences which are functions of array spacing and subsurface velocities from the plurality of CDP traces. The output from predynamics step 92 is then applied to a generate trace scan step 94 which composites or adds the plurality of CDP traces at each of a plurality of selected trace delays $\Delta t$, the $\Delta t$ per trace representing a time-velocity function relative to the plural CDP traces. The predynamics applied and the amount and number of $\Delta t$ examinations will depend upon a particular velocity function as determined from previous adjacent CDP traces or from knowledge of the subsurface velocity distributions of the area.

The plurality of scan outputs is then applied to a composite step 96 to develop a trace representation relative to the common depth point. Each composite CDP indication is a representation which emphasizes the occurrence of events which are aligned in time and amplitude in each of the related CDP traces. Similarly, events occurring in misalignment of time, and/or which are dissimilar in amplitude, will be deemphasized. This constitutes a form of common depth point stack and one form of suitable procedure is more particularly described and claimed in a co-pending patent application entitled "Method and Apparatus for Determining and Applying a Gain Function," Ser. No. 749,723, filed on Aug. 2, 1968 in the name of Sullivan et al and owned by the present assignee.

The composited scan information is then subjected to a step of event selection 98 wherein the centermost indication for each event is noted and retained. That is, the largest amplitude peak or, optionally, the center of energy of an event indication is retained while all lesser amplitude indications are collapsed into an array of parameters for the events which are stored. It may also be desirable to pass the retained peak amplitude indications through amplitude constraints to be more selective and discriminating for all primary events on each CDP scan trace. The CDP data consisting of selected primary events is then stored in conventional manner in a CDP composite storage step 100 where a plurality of previously derived CDP data scans are separately stored for selective recall.

A plurality of the related CDP scan sequences is then applied to a summation step 102. This amounts to the stacking of scan information from a multiple of basement points to derive a velocity or step-out response, i.e. the combining of equal time, equal scan responses as derived from multiple CDP traces. Further constraints to velocity and amplitude may be interposed in this step to assure retention of only desired event information as will be further described in greater detail.

Multiple basement point velocity or step-out responses from summation step 102 are then applied through velocity (stepout) selection step 104 whereupon they are subjected to further velocity constraint and/or velocity interpretations for subsequent conversion of times and stepout delays to times and velocities. The time and velocity outputs may then be applied directly to a suitable form of display 106, one of the conventional plotter or printer outputs, e.g. velocity vs. time graphs; or, the information can be digitally retained as full time readout.

The velocity selection step 104 may further process the multiple basement times and velocities by sorting times and velocities into standard or patterned units, e.g. time fraction classifications, and this information may be recorded as chart output or it may be applied back for control of a velocity function determination step 108. The velocity functions determination step 108 alternatively may receive output from summation step 102 for the purpose of determining a velocity function, and the pertinent function parameters may be conducted for feedback usage to generate velocity function for predynamics-step 92 to define the $\Delta t$ selection.

FIG. 5 represents a time-velocity representation similar to the automatically determined velocity (ADV) type of display. Such a time-velocity presentation as that of FIG. 5 might be compiled for one or more CDP trace groups to determine probable velocity function for the particular subsurface section. Thus, the trace group is examined repeatedly for events having a known or postulated time-velocity pattern, i.e. normally similar or successively greater velocities in feet per second accompanying time (depth) increases. The time-velocity representation may be graduated in time or depth versus velocity and, as can be noted from FIG. 5, a velocity trend can be noted as you progress down the presentation from shallower to greater depths. This trend line is in keeping with the theoretical findings throughout most of the oil-bearing regions of the world and such velocity trends can be relied upon to shorten the examining or processing time. That is, it can be noted that the great majority of event indication falls within the dashed trend lines 120 and 122, and it is safe to assume that these are the meaningful events and that all others lying outside the trend lines 102 and 122 effect great saving in time and expense of processing.

The carrying out of velocity stack processing entails the modification of a time-velocity presentation, such as that of FIG. 5, to include a comparison stacking of event findings for multiple basement points. For example, each of the plurality of CDP trace groups are subjected alternatively to predynamics and selected static time shifts for composition whereupon all events are picked. The picking of events may be approximated by determining amplitude or energy maxima and bounding minima. Selected event characteristics, viz amplitude threshold, times, polarities, velocity, etc. may be used for even identity from scan to scan, CDP to CDP, and then storage for output. Next, the velocity response for a given event from a selected CDP trace group or basement point may be compared with responses from adjacent velocities of the same trace group at a comparable time. Events which do not appear on several consecutive velocities and comparable times will be zeroed out, and this serves to reduce plotting of noise which presently obscures event plots on low signal-to-noise data.

Equal velocity or step-out responses for each of the multiple basement points or CDP trace groups are then selected for stacking; that is, the stacking of equal velocity responses which are also of comparable time including variations owing to dip and statics. Stacking is further constrained as events for each basement point must also peak within a predetermined range of velocities or offsets of one another in order to qualify for stacking as single events.

Figure 6:
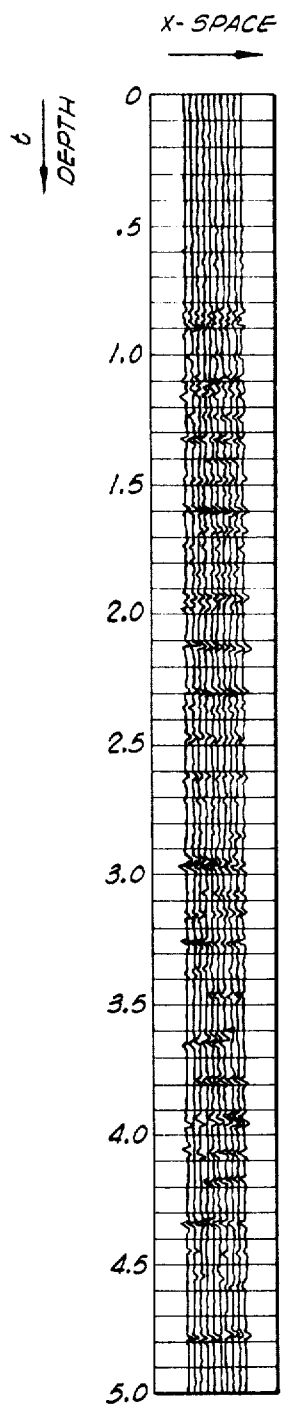
FIG. 6 is a wiggle trace presentation of seismic data in time-space parameters.
Figure 7:
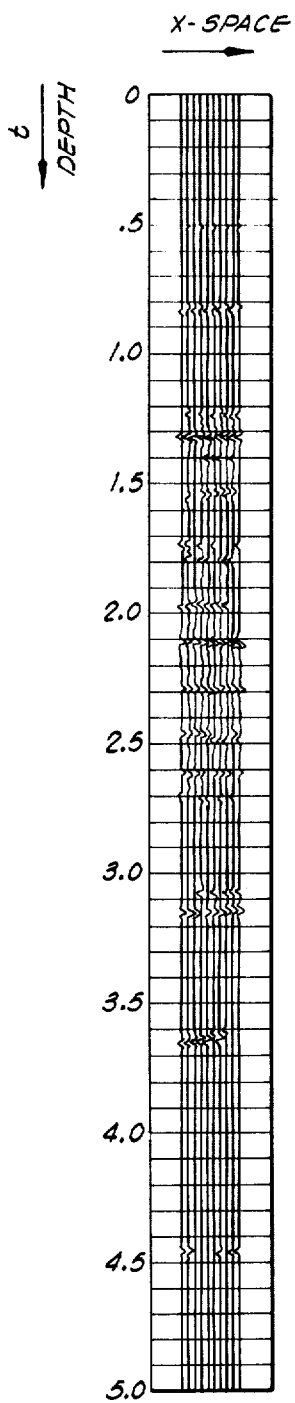
FIG. 7 is a wiggle-trace presentation of the FIG. 6 seismic data in time-space parameters and limited to display only primary event information.
Figure 8:
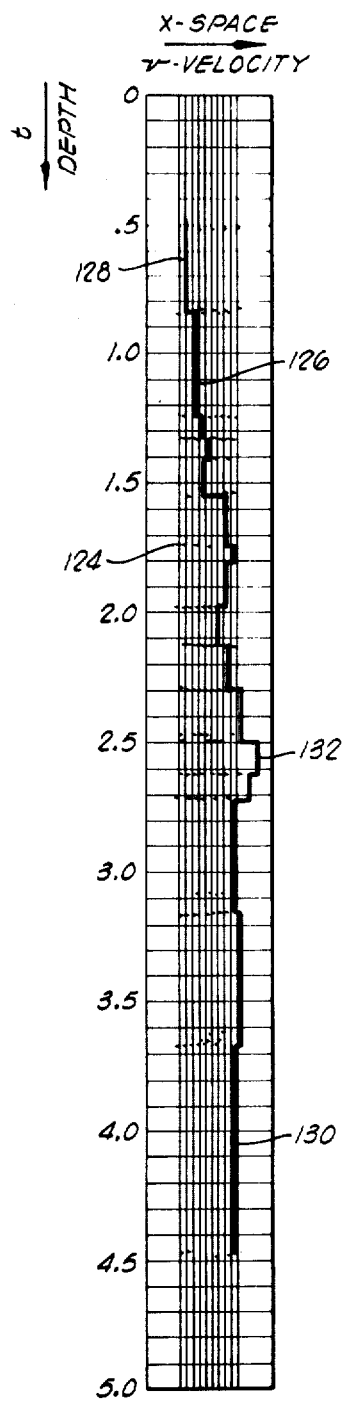
FIG. 8 is an impulse trace interval velocity combination of data extracted from the FIGS. 6 and 7 trace data and represented in time-space-velocity parameters.

FIGS. 6, 7 and 8 show, in idealized, manually approximated form, a succession of seismic data indications or plots leading to certain desirable results in the velocity stacking process. FIG. 6 is merely a representation and, in this case, the plurality of traces may represent a series of common depth point traces, i.e., the seismic responses as received by an array of consecutively displaced geophones. The seismic information of FIG. 6 has undergone certain basic corrections of constant nature such that it takes the form of an earth section wherein the vertical axis represents time or depth and the horizontal axis represents proportionate space $x$ along the earth's surface. The multi-trace seismic data of FIG. 6 would include primary reflections, multiple reflections, noise and various forms of interference return. It can readily be noted then, and this fact is especially appreciated by those skilled in the art, that the various squiggles and alternations of individual traces of the FIG. 6 representation require a high degree of interpretative skill, refinement and sometimes guess work to compile meaningful geophysical data.

The multi-trace presentation of FIG. 7 shows an idealized form of multi-tract wiggle display wherein primary events only are indicated. Such display output is enabled by the present method of velocity stacking which is capable of extracting primary events only from a thoroughly masked raw presentation. Velocity stack processing has the capability of examining individual events of plural, different time-equated CDP trace results so that only primary events are detected. Further examination and interpolation of primary events relative to their time and velocity enables the derivation of interval velocities and addition of these, as shown in FIG. 8, compiles a still more meaningful sectional display of seismic data.

Thus, the seismic section of FIG. 8 shows the primary events for a given vertical section of terrain, in this case primary responses are further refined by well-known devices and indicated in impulse form, and this information is overlayed with a graph indicating the seismic energy velocities in the various intervening strata between the plurality of primary events. The primary events in impulse form are preserved in accordance with horizontal disposition of space $x$ versus time or depth, dip variations and polarities being preserved. The velocity $v$ is indicated as the variable line 126 which ranges from a velocity of 700 feet per second at a most shallow indication 128, to a velocity of 14,500 feet per second at a deepest indication 130, but having experienced a peak velocity of approximately 18,000 feet per second at a mid-point 132 in its downward travel.

There are various forms of apparatus which are suitable for carrying out the method of the present invention and FIG. 9 illustrates one form of analog equipment which may be employed to perform velocity stack processing. CDP input traces are applied a group at a time at input 140 to a conventional form of amplifier distributor 142. Each group of CDP input traces from amplifier distributor 142 is then applied in parallel on each of cable inputs 144a through 144n to respective record scanners 146a through 146n. The record scanners 146a-n each perform scanning of the plural CDP record traces at proportionately different $\Delta t$ delays to evaluate the traces for various step-out functions. The number and amounts of $\Delta t$ may be derived from prior knowledge of the subsurface section as would normally be evidenced from determined velocity functions for similar trace data. The record scanners 146a-n may consist of well-known seismic recording and playback apparatus of the multi-channel, variable-time readout types.

The CDP trace information, having been scanned at different $\Delta t$ values, is then present on output cables 148a through 148n as a plurality of time-displaced CDP signals for input to a compositor 150. The compositor 150 serves to algebraically sum each of the pluralities of time-displaced CDP signals from each of the cables 148a through 148n, and the respective composited CDP signals are conducted via lines 152a through 152n for storage on separate channels of a plural channel recorder 154. The compositor 150 may include additional trace processing in the form of MDS or mean differential summation processing as described in the aforementioned patent application, Ser. No. 749,723. Also, still other known forms of seismic data stacking may be utilized to enhance the event data derived from the individual CDP parts of time-displaced signals.

The plurality of time-displaced CDP signals from plural channel recorder 154 are available via outputs 156a through 156n for selection by a trace selector 158 for presentation to further processing circuitry. Selected ones of the time-displaced CDP signals may be applied to a peak detector 160 for the purpose of verifying and indicating the peak of peaks per envelope, i.e., the exact center of a peak or trough as it is bounded by a lesser half cycle on each side. The peak detector 160 may take the form of various well-known analog circuits and it serves to pinpoint the center of every possible event which could be a primary event. An amplitude threshold detector 162 is included for optional usage. The threshold detector 162, of conventional type, is interposed to receive selected CDP signal data from trace selector 158 whereupon it is constrained for predetermined amplitude characteristics prior to introduction to the peak detector 160. This provides further verification as to its validity as a primary event.

The output from peak detector 160, a succession of selected events from CDP composite signals each representing an incrementally varied time-displaced trace, is applied through a time gate 161 to a separate channel of plural channel recorder 163. The time gate 161 may be a conventional adjustable time gate of well-known type which differentiates event pulses with respect to event bounding times. The separate channels of composite signal data from recorder 163 are then readout via parallel networks 164a, b, c through 164n, each of output networks 164a-n, being connected in parallel to a respective input channel of one of a plurality of scanners 166a, 166b, 166c and 166n.

The scanners 166a through n may be a form of seismic processing equipment which is well-known in the art. Thus, they may be such as plural channel drum recorders having read-in and/or read-out head assemblies which are circumferentially displaceable about their respective recording tracks. This enables a selected variation of further time-displacement or velocity constraints as between the data on respective ones of the tracks of each of the respective recorder assemblies, i.e., each of scanners 166a-n, for purposes of further event definition for each CDP group.

Outputs from record scanners 166a–n are provided on respective output connections 168a, b, c through n to constraint option circuitry 170. Constraint option circuitry 170 may consist of various well-known forms of limiting, peaking and time gate circuitry which serves to accentuate trace data still further to represent event information more closely. Output from constraint option circuitry 170 is applied to a channel selector 172, a multi-output distribution switch, which serves to place the selected CDP event signal information into designated storage areas. Thus, channel selector 172 provides output via network 174a to a selected recording channel of the plural channel recorder 176a, CDP signals from successive groups being placed in adjacent channels. Similarly, output networks 174b, c–n provide input to selected channels of respective plural channel recorders 176b, c–n.

Successive samplings of CDP event signal information are then retained on respective selected channels of each of the plural channel recorders 176a, b, c–n. This information is then selectively recalled for multiple depth point processing to further prove primary events to the exclusion of multiples and noise response. A multiple switch network or scan selector 178 serves to select one of output cables 180a, b, c–n from plural channel recorders 176a, b, c–n for output via cable 182 to a summation network 184. Cables 180a–n each carry similar information as to step-out removal, bounding times and event definition from each of a plurality of common depth points, and scan selector 178 selects one of plural channel cables 180a–n for application to summation network 184. Summation network 184 may be a conventional type of summation apparatus which is well-known in the art for use in straight summing of plural electrical indications relative to time, e.g., plural channel, adjustable head recording equipment.

The summation network 184 provides an output whereby time-coincidence event information is further enhanced to the exclusion of less regular event information, and its output may undergo further constraint options 186 prior to output on a lead 188 to channel selector 190. Constraint option circuitry 186 may perform delineating functions similar to those previously described. That is, peaking and limiting of event responses and determinations of event bounding times may be performed and, in addition, polarity response circuitry may be introduced to provide further signal characteristic identities.

The channel selector 190 then applies multiple depth point velocity or event information from lead 188 to a selected channel of a plural channel recorder 192. Upon compiling a plurality of adjacent or otherwise related multiple depth point data groups, the plural channel recorder 192 can apply plural outputs via leads 192a, b, c–n to a velocity filter 196 which further establishes velocity relationships of all events in the particular seismic section under investigation. Velocity filter 196 may be comprised of circuitry which has found recent usage in the geophysical prospecting art. For example, equipment teachings as set forth in U.S. Pat. No. 3,395,386 entitled "Method and Apparatus for Wide BanK Velocity Filtering," filed July 30, 1968 in the name of Brown et al, and owned by the common assignee, may be employed to establish various forms of velocity information relative to carrying out the process.

The output from plural channel recorder 192 and velocity filter 196 may be employed variously, depending upon the particular form of output and the information to be established. Thus, a first velocity output 198 may be preserved in a selected recorder 200 while the same information is converted in an analog-to-digital converter 202 for input to an associated computer 204. Digital computer 204 can then process the derived information in a great number of different ways to derive highly refined information of a desired nature. Another data output 206 as selected from recorder 192 may be applied to a plotter 208 whereupon the plot of time vs. velocity is graphically compiled in well-known manner. Still another parallel output is employed for compilation of specific velocity data. Thus, velocity data input on lead 210 is applied through count time circuitry 212 and a parallel-connected count velocity circuitry 214 with common output applied to velocity function determination circuitry 216. There are various forms of circuitry for carrying out the velocity function determination and this circuit function, as well as the count time and count velocity circuit functions, is best carried out digitally, as will be further described below. In any event, the velocity function determination as derived for a particular terrain or plurality of common depth point trace groups is employed in initial set-up of record scanners 147a–n and record scanners 166a–n, and the selection of their various scanning times $\Delta t$ through $\Delta t_n$ and $m\Delta t$ through $m\Delta t$, respectively.

In operation, it is the aim to process a plurality of related common depth point trace groups. For example, the CDP trace groups may be derived from successively displaced common depth points as depicted in FIG. 2. Each of the CDP trace groups is individually processed through the CDP processing section of the FIG. 9 circuitry whereupon it is stored in a selected channel of each of plural channel recorders 176a–n. Upon processing and having stored a selected plurality of CDP trace groups in the plural channel recorders 176a–n, these may be unloaded through scan selector 178 to derive a multiple depth point indication of the seismic data, an indication of event information, time versus velocity, which is further plotted and processed for interpretive use. A finally determined velocity function from function determination circuitry 216 provides recyclic input data for optimally adjusting the scanning times through the CDP processing circuitry.

A first group of CDP input traces will be applied in parallel to each of record scanners 146a–n whereupon the group is scanned at a plurality of different scanning times, $\Delta t$ through $\Delta t_n$; and then, each of the scanned trace groups or CDP signals undergoes compositing and recording on a channel of plural channel recorder 154. This initial scanning removes residual $\Delta t$ variation to correct for normal movement and, in effect, it converts the trace times to those for generally vertical travel paths. Each of the composited signals from plural channel recorder 154 is selectively subjected to the action of the amplitude threshold detector 162 and/or peak detector 160 and time gate 161 to further accentuate event signal information, and the output is recorded in a selected channel in a plural channel recorder 163. The plural channel recorder 162 can then be unloaded, all channels simultaneously, for parallel input of all channels of information to the respective record scanners 166a–n. Record scanners 166a–n have their respective scanning times $m\Delta t$ through $m\Delta t_n$ set in accordance with a desired velocity function as may be determined from velocity function determination circuitry 216 or from known parameters of the terrain. This then provides a plurality of CDP event signal outputs for one common depth point, each of the CDP event signal outputs on leads 168a–n being selectively representative of equal velocity functions or relationships.

The plural CDP event signals are then subjected to constraint option circuitry 170 whereupon channel selector 172 routes each CDP event signal for recording in a selected channel of respective ones of plural channel recorders 176a–n. A plurality of CDP event signals from successive, different CDP trace group inputs (at input 140) is similarly processed through to eventual placement in storage on respective selected channels of the plural channel recorders 176a–n. Then, multiple depth point processing can proceed by selectively unloading plural channel recorders 176 to effect further isovelocity event comparisons as derived from a still more broad base of data. The scan selector 178 presents selective outputs from each of plural channel recorders 176a–n for summation in summation network 184 and constraint circuitry 186 such that it derives response to equal velocities for a selected group of related basement points.

Figure 10A:
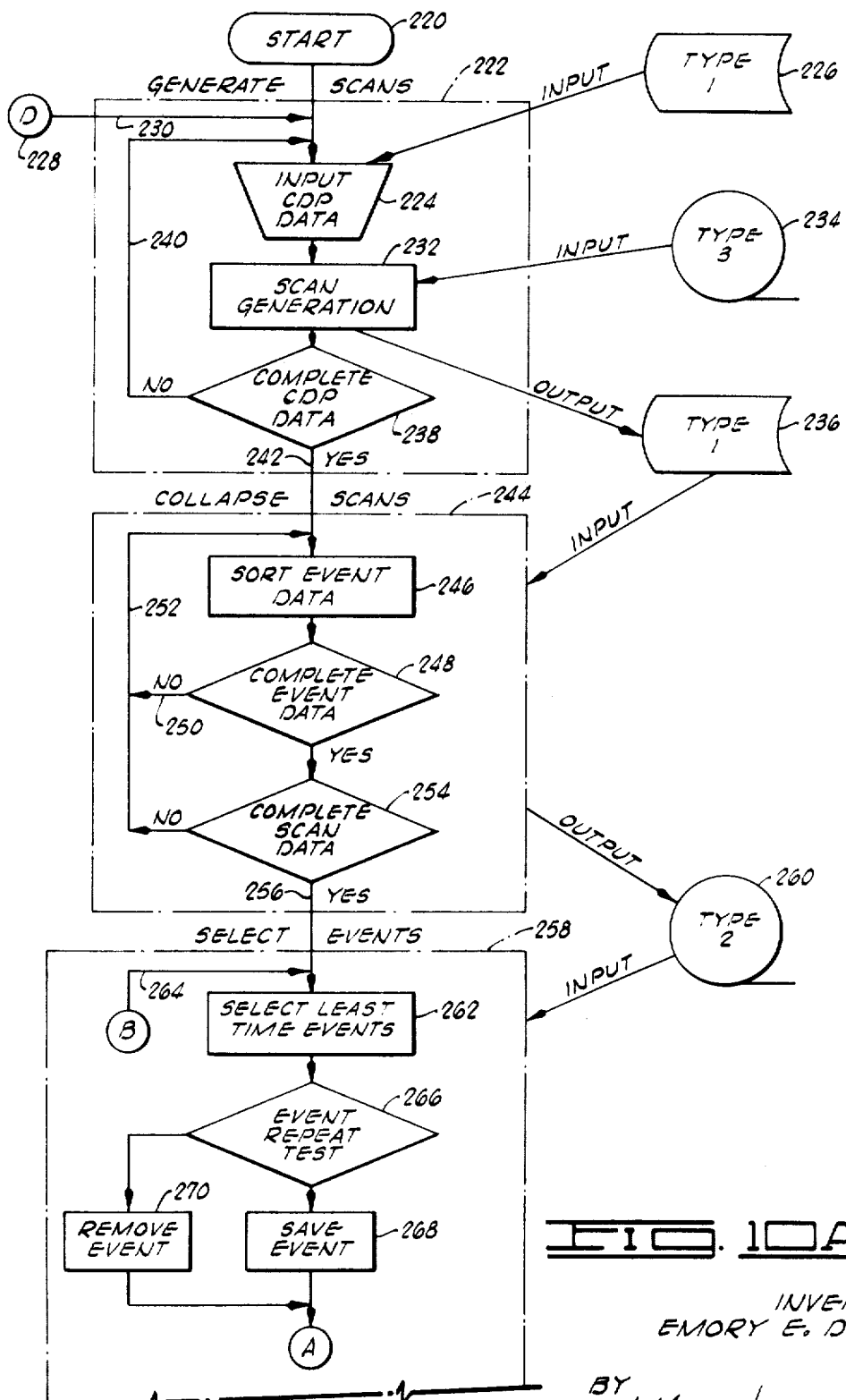
FIGS. 10A, 10B and 10C are successive related parts of a flow diagram indicating programmed digital data processing in accordance with the present invention.

Digital processing in accordance with the present invention proceeds as outlined by the data flow in FIGS. 10A, B and C. Thus, processing commences at start terminal 220 to start processing of a generate scans module 222. An input CDP data stage 224 receives input of sets of CDP parts in consecutive order as applied from random access disk storage 226, a type 1 storage as will be further defined. Recycled data from advanced processing stages, to be further described, is applied at D connector 228 connecting to input 230. The CDP data from random access disk 226 may be retained in typical array with successive trace information of selected time-length being stored successively for each CDP, each of successive CDPs being further stored successively along an addressable location.

The input CDP data stage 224 serves to select and input one set of CDP data parts to a scan generation stage 232, a type 3 tape storage 234 having data time and velocity information, and this data is applied as input to scan generation stage 232. Scan generation stage 232 serves to shift successive ones of traces $l$ through $n$ by a preset $\Delta t$ per trace in accordance with a known hyperbolic function whereupon the information from all traces is summed. The summed data output from scan generation stage 232 is then applied to a save storage or random access disk storage 236, a type 1 storage. Output from scan generation stage 232 is also applied to a decision stage 238 to determine whether or not there are more CDP data blocks in the particular processing pass. Thus, if CDP data is not complete, a NO output via line 240 is recycled to input CDP data stage 224 to further complete the collection of CDP data. If the CDP data is complete, a YES output via line 242 applies data to a collapse scans module 244 which serves to collapse the stacked traces on each scan.

The input line 242 applies data to a sort event data stage 246, a predefined processing stage, which sorts for peak amplitude, time, number of cycles and the boundary time for an event. Thus, for each event, process stage 246 selects a peak of peaks, i.e., a peak or trough indication bounded by lesser half cycle pulses on each side, and amplitude constraints may then be imposed. Additionally, the peak amplitude, peak polarity, peak time and event bounding times are determined for each event. This data being determined, data flow proceeds to a decision stage 248 to test for completeness of event data. If all event data is not accounted for, recycle is signified via NO output 250 and returned on flow line 252 for input to sort event data stage 246. If the event data is complete, a YES output provides data flow to decision stage 254 which tests for completeness of scan data. Thus, decision stage 248 determined whether or not all events for a given scan have been considered and, if YES, decision stage 254 tests to see if all scans have been completed.

Upon completion of scan data in decision stage 254, data flow proceeds via line 256 to a select events module 258 which serves to define event information. A save tape 260 retains information from collapse scans module 244, i.e. i.e. type 2 information including time, amplitude and polarity, boundary times, and number of cycles for consecutive CDP information, as will be further described below. Save tape 260 provides input into select event module 258. The data flow on line 256 is applied to a process stage 262 which selects least timing events. In addition, recycling the input at connector B applies information via line 264, such information being derived at an advance processing stage as will be further described below.

The processing stage 262 searches all scans for each CDP data group to extract the event with least time. Thus, the processing searches for the least time event by moving toward scans with lesser step-out removal, then the data may be constrained to require that step-out between events on separate scans must equal a scan removal difference plus some input variable. Output from processing stage 262 is then applied to a decision stage 266 which performs an event repeat test. Thus, decision stage 266 tests for whether or not the instant considered event appears on a next predetermined number of scans which have some less $\Delta t$ removal. Constrained options are adjusted such that events may appear on "x" consecutive scans, and the event indication can be limited to the largest "z" responses, and events may be required to be of high polarity. If constraints are met, output from decision stage 266 proceeds to save event stage 268 and, if constraints are not met, data signification proceeds to a remove event stage 270 to effect necessary adjustment.

Figure 10B:
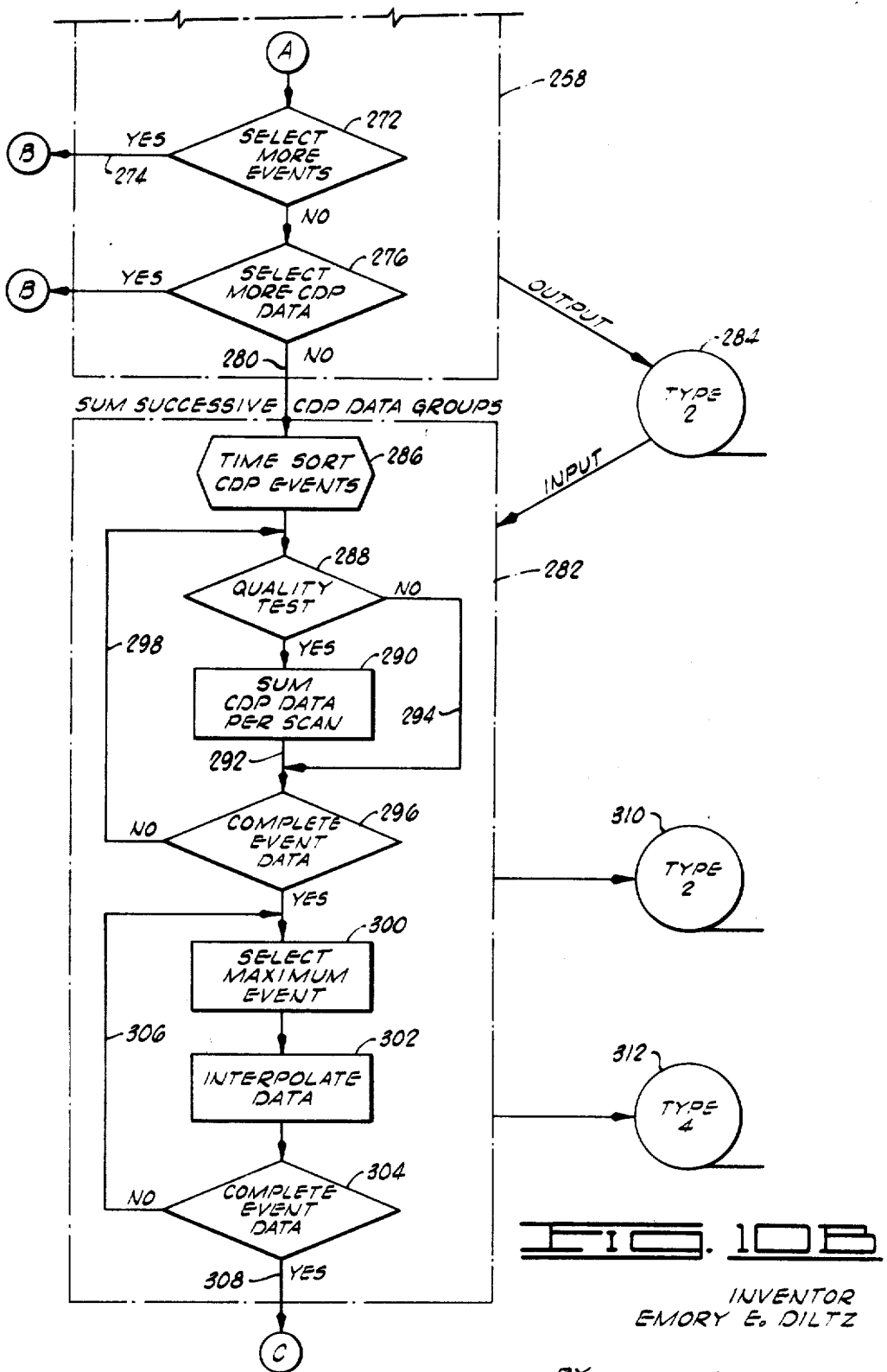

Data flow from the terminal connector A of FIG. 10A translates to terminal connector A of FIG. 10B whereupon the data is applied to a select move events decision stage 272 which tests for whether or not there are more events in the presently considered CDP data. If there are such events, output is via line 274 and terminal connector B which provides recycle data to terminal connector B and line 264 for input to the selected least time event stage 262. If no more events are required in decision stage 272, output is via the NO output to a decision stage 276 which tests as to whether or not there are more CDP data groups to be considered. Here again, if decision stage 276 indicates YES, data flow is via terminal connector B, but if CDP data is complete the output proceeds via line 280 to a next module 282.

Module 282 serves to sum excessive CDP data groups and data from module 258 is placed in a save tape storage 284, i.e. type 2 data indicating time, amplitude-polarity, boundary times and number of cycles, and save tape 284 provides input to module 282. Data input on lead 280 is applied to a process stage which serves to sort CDP events according to time, and then to provide data output to a quality test decision stage 288. Quality test stage 288 serves to determine whether or not events with smallest time appear on enough CDP groups. If stage 288 finds an event qualification, the output is applied directly to stage 290 which serves to sum the CDP data on respective equal scans for the particular event with data output proceeding via line 292. If quality test 288 is negative, output proceeds via the NO output line 294 for direct input to a decision stage 296 which tests as to whether or not all event data is completed. If all event data has not been considered, output is recycled via line 298 to the input of quality test 288, and a YES indication allows data to proceed to a select maximum event stage 300. Thus, stage 300 isolates a maximum response of each event plus one response on either side thereof.

The output from stage 300 is then applied through an interpolate data stage 302 which utilizes the data established in the previous stage 300 to interpolate for maximum amplitude, time and scan on which the data values will occur. Output from interpolate data stage 302 then proceeds to a decision stage 304, a complete event data stage, and if all event data has not been considered the data flow is through recycle line 306. If event data is complete the flow is via line 308 to connector terminal C.

Save information of type 2 data is applied out to a tape storage 310, and save information of type 4, i.e., information as to interpolation time, interpolation amplitude and interpolated velocity for first event to a last event, is placed in save tape 312 for later recall.

Figure 10C:
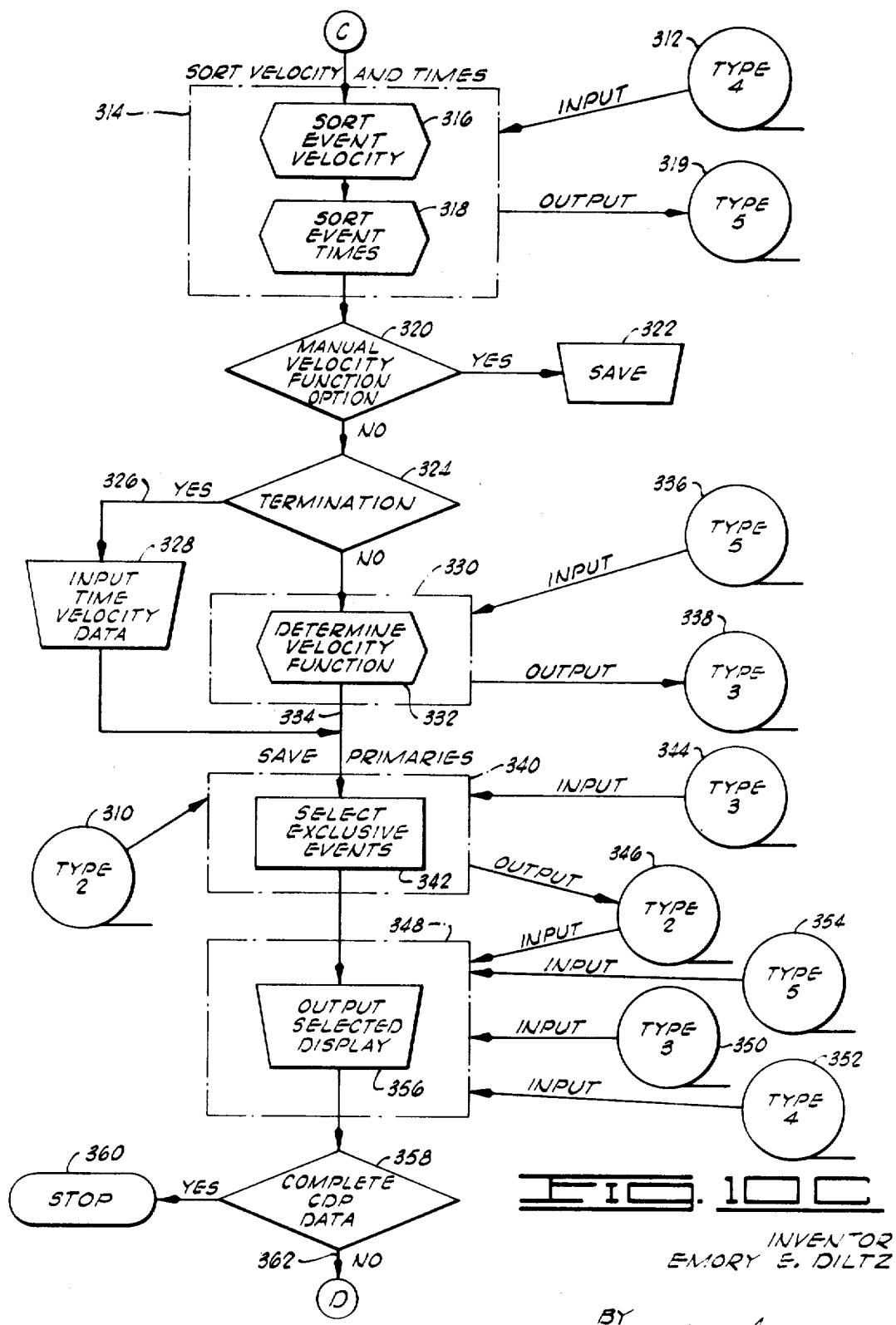

Referring to FIG. 10C, data proceeding from summation module 282 is applied at connector terminal C for input to a sort velocity and times module 314. Thus, save tape 312 (as also indicated in FIG. 10B) provides input of the interpolation information to module 314 which, when considered together with data input from terminal connector C, allows a predefined process stage 316 to sort the interpolated velocities for the events into standard units. The sorted data is then applied to a next predefined process stage 318 where event times are determined by sorting interpolated times for the events into even units. Thus, sorted data relating to velocity and time for each event is then applied to a decision stage 320 which provides the option of outputting data to a save stage 322 for subsequent use in manual velocity function determination, or in outputting the data to a next decision stage 324 which selects as to processing termination.

If decision stage 324 indicates termination, output is via line 326 to an input stage 328 which calls in additional data of type 3, i.e., stored time and velocity data. If termination is not indicated at decision stage 324, data flow proceeds through a modular stage 330 consisting of a predefined process stage 332 which determines the velocity function. Modular stage 330 serves to derive automatic velocity function determination for output via line 334. Type 5 information i.e., stored information relating to unit velocities $l$ through $n$ from the first time unit through a last time unit. Also, type 3 information as to time and velocity is output from module 334 storage in a save tape 338.

The velocity function of data output via line 334 is then applied to a save primaries module 340 and its selective exclusive events stage 342. Type 3 time and velocity information is input from a tape 344 to module 340 and stage 342 serves to remove events which do not fall within the range of the velocity function. Type 2 information output from module 340 is placed in tape 346 for selective recall and input to a display module 348. The display module 348 also receives type 3, type 4 and type 5 input from respective save tape structures 350, 352 and 354. The output module 348 includes an output stage 356 which serves to construct an output presentation of the data in a desired form. Thus, any of several output displays may be selected to illustrate the results in terms of pertinent parameters of time, displaced depth, trace-by-trace determination, etc. The output information as derived from stage 356 is again tested in a decision stage 358 to determine whether or not all CDP data has been considered. If so, a YES output signifies accordingly at a stop terminal D for recycle input to generate scans module 222 via line 230.

Figure 12A:
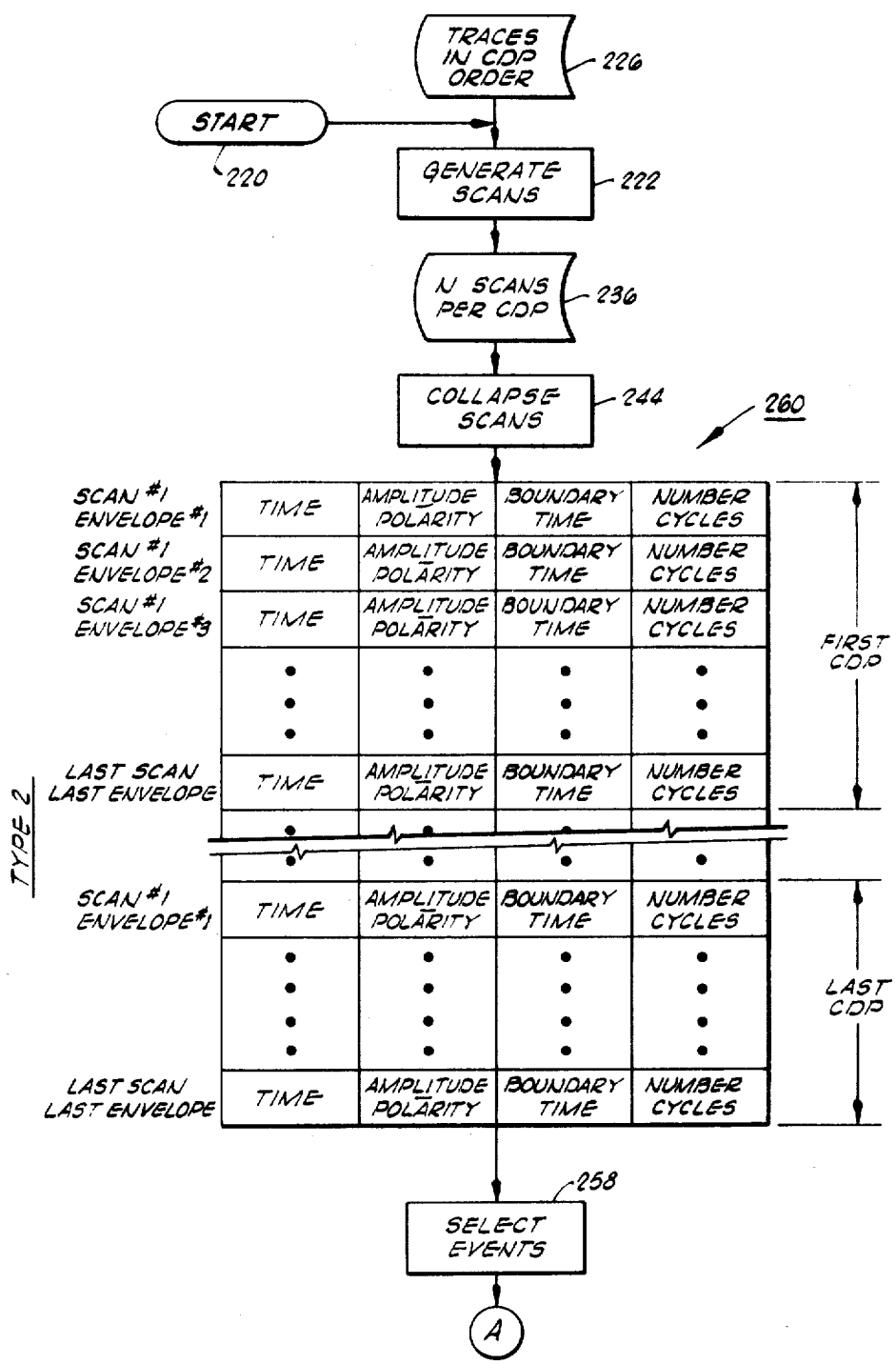
Figure 12B:
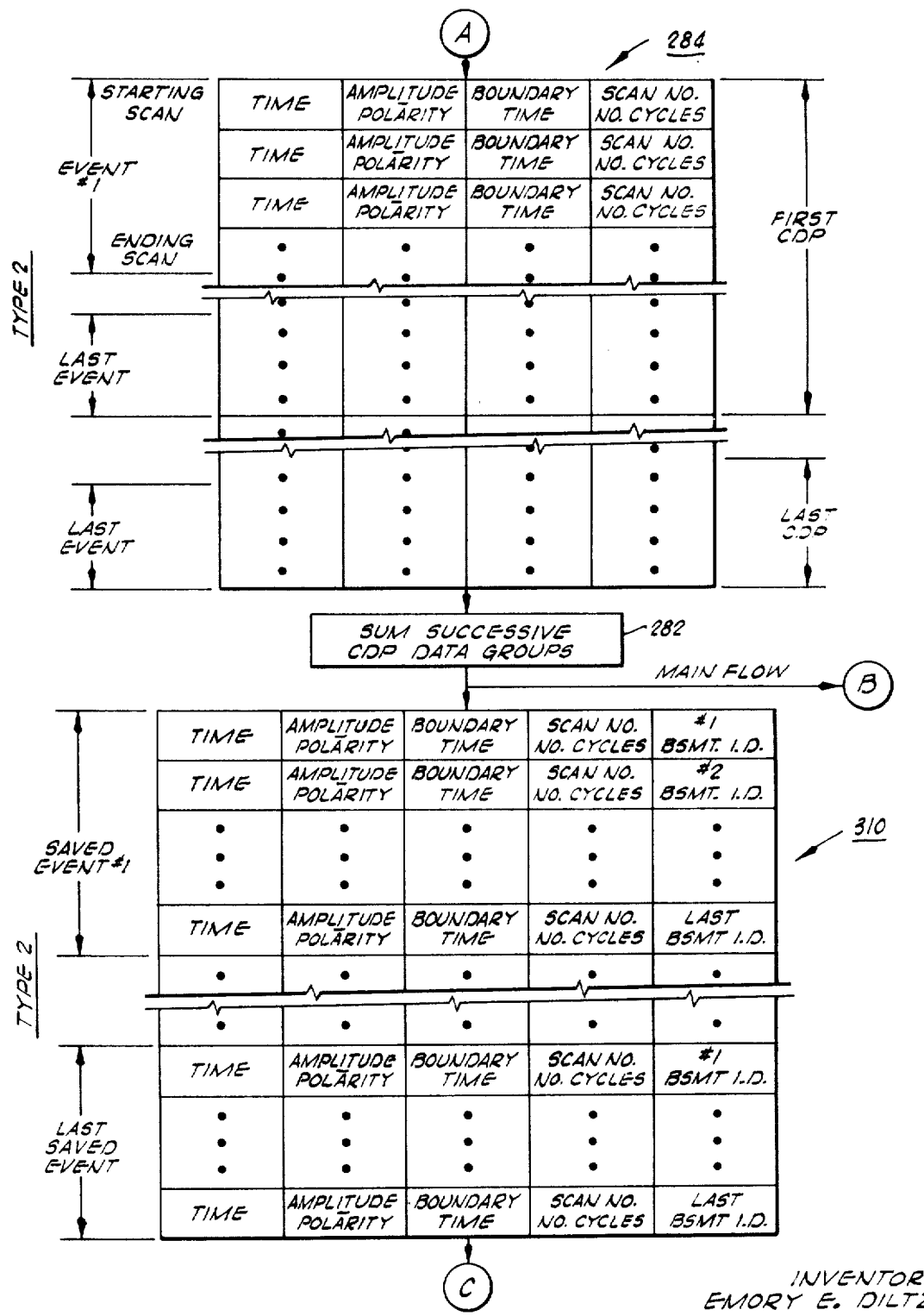

The functional block diagrams of FIGS. 12A, B and C illustrate the array layout for velocity data stack. Flow stages similar to those illustrated in FIGS. 10A, B and C are designated by like numbers. Thus, the input trace data in CDP order as obtained on random access disk 226 of FIG. 10A, is applied as input to generation scans 222 and the digital process is signified to begin at start 220. Output from the generate scan stage 222 is applied to random access disk storage 236, a type 1 storage, which retains some designated number $n$ of scans for each CDP trace data group. Thus, information recorded at random access disk 236, as formulated by generate scan stage 222, consists of data having undergone predetermined $\Delta t$ removal of plural traces of CDP data, and it is thereafter composited to form a unitary amplitude versus time function. This data is then recorded in type 1 format wherein successive traces $l$ through $n$ are recorded for each CDP, plural CDPs being recorded in serial order.

The output from random access disk 236 is then applied to collapse scan stage 244 for the purpose of picking the desired peaks without consideration of polarity, i.e., to examine in the time domain and to pinpoint the centers of possible primary events. Thereafter, the collapse scans output is stored in tape storage 260 in type 2 format as illustrated. That is, information input consists of consecutive scans each made up of successive envelopes of peak information. An envelope is defined by the program process in keeping with expected polarity and amplitude considerations of primary events, and it represents the indication of a single seismic event or that energy defined by a one-half cycle maxima indication of such. Thus, each successive envelope of each successive scan is examined for time, amplitude and polarity, event boundary time (e.g. time between half-power points) and the number of cycles. This information for each consecutive scan is recorded for each of the first CDP through the last CDP data groups. Tape storage 260 utilizes a maximum estimated size of 50,000 words per CDP.

Output of the type 2 information from tape storage 260 is then applied to the select events stage 258. The output from select events stage 258 serves to qualify each event as to consistency and reliability whereupon data is output to a tape storage 284 and once again data is saved in type 2 format. Thus, data relating to the first CDP through the last CDP is serially recorded and data for each CDP is individually serially recorded in terms of successive events per CDP. Tape storage 284 requires an estimated storage of 50,000 words per CDP. Output from storage 284 is then applied to the sum successive CDP data groups stage 282 which performs, as previously described, to output data to storage tape 310 in yet another type 2 format. The format of storage tape 310 stores event data of successive events for each of successive CDP data groups. The maximum estimated size of storage tape 310 is 25,000 words, The output or connector terminal C from storage tape 310 is applied at connector terminal C of FIG. 12C.

Additional output from the sum successive CDP data groups stage 282 is applied via connector terminal B (See FIG. 12C) to tape storage 312 which saves the data for successive events in type 4 format. The maximum estimated size of storage tape 312 is 3,000 words, and this storage serves to save data for successive events of each CDP data group, i.e., data relating to interpolated time, interpolated peak amplitude, and interpolated velocity. The data output from the tape storage 312 is then applied to a sort velocity and times stage 314 which serves to classify events as to velocity and times.

It is also at this point that an option stage 380 can be exercised. That is, data as interpolated and placed in tape storage 312 can be output in accordance with some manually determined velocity function. Otherwise, data from sort stage 314 is applied through a determine velocity function stage 330, which information is considered with externally assessed and input information from velocity function input option 382, and is placed in storage 338/344 in type 3 format. That is, the data is stored in successive time-velocity relationships in serial order.

Output from sort velocity and time stage 314 is also applied to a tape storage 319/354 in type 5 format. This data is assembled in terms of time window parameters and is recorded in serial order for data of each time window for each of a plurality of selected velocity amplitude indications. The outputs from each of tape storage units 338/334 and 319/354 are applied through the display module 348 for output in any of several selected display formats, viz velocity chart display 384, cross-section display 386 and/or print out of various information 388.

The main flow of data from storage 338/344 is through a reduced cross-section stage 390, actually a portion of save primaries module 340 in FIG. 10C, and stage 390 serves to reduce the cross-section of data by accumulating an array in accordance with a pre-set velocity function. The output from stage 390 is then further processed in select event stage 392 wherein the cross-section array is allowed to remain in the same format type and is limited to contain only primary events. This data is then applied to display module 348 for output in selected format or representation.

Various forms of display and permanent storage may be included to provide a record of all displayed intelligence. Included too may be a digital tape storage compatible with various types of presentation systems and suitable for long-term storage. The output storage of display module 348 should retain various types of information for each event. Thus, for each spread or group of CDP data, the event information should include polarity, velocity, amplitude and frequency while, for each basement point, event information should include bounding time, polarity, velocity, amplitude and frequency.

Retention of the above-enumerated spread in basement point event information will then allow compilation of the time versus average velocity for individual events for multiple basement points with capability of utilizing various forms of spread information, e.g., overlapping multiple spread, fractional multiple spread, etc. The retained characteristic value also enables computation of interval velocity and various adjustments for curved path which might be encountered.

The output information is subject to use in novel and highly definitive display forms to depict time versus depth or displaced depth in various presentations. Digital recordation of event data may be carried out to include a plot of event amplitude, indicating polarity and having the frequency and velocity printed in identifying proximity to event indications. Similarly, average velocity and interval velocity can be inserted in the overall plot as can event length bounding time indicators. FIG. 11 shows a portion of a digital data plot conveying the various forms of data information relating to a velocity stack output display cross-section.

Thus, as shown in FIG. 11, a digital output may indicate a particular event 400 as its response shows up in multiple basement point evaluations and its polarity may be indicated by the rightward or leftward orientation of the impulse marking on the plot. Interval velocity and time or depth interval may be indicated by printed or other indication marked on graphic interval velocity bar, the mean of such vertical bars lying in center position with respect to a common depth point grouping (spread). Thus, a line 402 a vertical line, is displaced in horizontal position proportionate to an interval velocity of 8,700 feet per second, as noted by digits 404. The time or depth interval is indicated by digits 406, i.e., digits representing 0.436 seconds travel time.

Amplitude and average velocity may also be noted on the display output by marking directly over the pertinent event. Thus, digits 408 indicate the event amplitude in a suitable unit while digits 410 represent an average velocity which, in this case, is 6,800 feet per second. The amplitude of spikes may also graphically display relative event amplitudes. Digits 412, below the event, are a direct reading of the frequency in cycles per second or the hertz value of the event. The dot marks 414 and 416, flanking each of the event impulses, are bounding time indicators which denote the actual event length.

The foregoing describes a novel method for processing seismic data which enables more efficient interpretation, and improvement in interpretive decisions would be apparent since evaluation of seismic data is essentially reduced to numbers decisions or highly objective reasoning. The present method can be carried out at an expense comparable to present seismic data processing and interpretation schemes, and its value is further enhanced by the capability to distinguish between events and to detect low amplitude events which otherwise might be masked and lost due to high noise content. The method of the present invention has still further attributes of speed of processing in that it has the capability if isolating primary events for evaluation in terms of time and velocity of each event, coupled with the ability to interpret interval velocities and times along the depth of the seismic section.

Velocity stacking in accordance with this invention makes possible a selection of individual events by peak amplitude identification. The method constitutes a signal recovery technique which is capable of detecting seismic signal energy which is far down in signal-to-noise ratio, and it provides an event picker or recognition system which can correlate across multiple basement points with respect to time on the basis of both (a) velocity and (b) amplitude. The velocity stack procedure has the capability of compiling information for multiple basement points in an iso-velocity grouping relative to time.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A method of velocity stacking multi-trace seismic information wherein selected seismic trace indications are continuously summed to derive only primary event information, comprising the steps of:
    dividing said multi-trace seismic information into plural trace groups of plural sequentially related channels each trace group representing seismic trace information signals as derived for a common depth point;
    analyzing said information signals to determine velocities for seismic events occurring at greater than a selected amplitude on each channel of each common depth point trace group; and
    summing all event velocity determinations of each common depth point trace group relative to trace time to provide a multiple depth point output of selected event velocities versus time.

2. A method of velocity stacking as set forth in claim 1 which is further characterized by the step of:
    performing velocity constraints on each common depth point trace group such that only those events having selected duration and velocities within a preselected range of velocities are subject to the step of determining velocities.

3. A method of velocity stacking as set forth in claim 1 wherein said step of determining comprises:
    selecting events which occur on a predetermined number of adjacent ones of said common depth point trace groups;
    further dividing said common depth point trace groups into a plurality of successive time-displaced trace groups; and
    comparing each of said selected seismic events which occur within approximately equal times for each trace group to establish velocities for all of said seismic events of each common depth point trace group.

4. A method of velocity stacking as set forth in claim 3 wherein said step of selecting comprises the steps of:
    removing residual $\Delta t$ from respective traces of each common depth point trace group; and
    compositing each of said step-out removed traces such that said common depth point trace group is represented in vertical seismic signal travel time.

5. A method of velocity stacking as set forth in claim 1 which is further characterized to include the steps of:
    plotting each event relative to travel time as an impulse marking on one of a plurality of parallel lines, each parallel line representing the travel time scale for each common depth point trace group; and
    overlaying said plotted impulse indications with a graph of event velocities versus travel time, said overlaid travel time scale coinciding with said first plotted travel time scale.

6. A method of velocity stacking as set forth in claim 3 which is further characterized to include the steps of:
    plotting each event relative to travel time as an impulse marking on one of a plurality of parallel lines, each parallel line representing the travel time scale for each common depth point trace group; and
    overlaying said plotted impulse indications with a graph of event velocities versus travel time, said overlaid travel time scale coinciding with said first plotted travel time scale.

7. A method of velocity stacking as set forth in claim 4 which is further characterized to include the steps of:
    plotting each event relative to travel time as an impulse marking on one of a plurality of parallel lines, each parallel line representing the travel time scale for each common depth point trace group; and
    overlaying said plotted impulse indications with a graph of event velocities versus travel time, said overlaid travel time scale coinciding with said first plotted travel time scale.

8. A method of velocity stacking as set forth in claim 1 which is further characterized to include the step of:
    determining a time-velocity function with all primary event indications present in the multi-trace seismic information, and limiting the step of determining velocity for seismic events occurring on each common depth point trace group to those velocities which approximately coincide with the determined time-velocity function.

9. A method of stacking multi-trace seismic data indicative of equal time and equal velocity seismic energy, comprising the steps of:
    deriving plural groups of seismic data traces, each data trace group being representative of sequentially related seismic information signals relative to a common depth point;
    analyzing said information signals and determining for each common depth point data trace group event indications having greater than a selected amplitude and having the same times and same velocities; and summing said event indications of each seismic trace group to derive parameters of multiple basement point events having comparable time and velocities.

10. A method of stacking multi-trace seismic data as set forth in claim 9 which includes the further steps of:

constraining event indications of the common depth point data trace groups such that only those event indications present on a predetermined number of adjacent data traces are acceptable for further processing in the step of summing said event indications, and limiting said further processing to said acceptable event indications.

11. A method of stacking multi-trace seismic data as set forth in claim 10 which is further characterized to include the step of:

placing further amplitude constraint upon said data trace group event indications whereby only event indication exceeding predetermined amplitude threshhold are applied to the step of summing said event indications.

12. A method of stacking multi-trace seismic data as set forth in claim 9 which is further characterized to include the steps of:

plotting each of said multiple basement point events relative to travel time as an impulse marking on one of a plurality of parallel lines, each parallel line representing the travel time scale for each common depth point trace group; and overlaying said plotted impulse indications with a graph of multiple basement point event velocities versus travel time, said overlaid travel time scale coinciding with said first plotted travel time scale.

13. A method of stacking multi-trace seismic data as set forth in claim 9 which is further characterized to include the step of:

determining a time-velocity function for all primary event indications present in the multiple basement point event indications, and limiting the step of determining event indications for each common depth point data trace group for those velocities which approximately coincide with the data determined time-velocity function.

14. A method of stacking multi-trace seismic data as set forth in claim 13 which is further characterized to include the steps of:

providing an output display wherein all events are indicated in terms of time versus velocity of the event.

15. A method of multi-trace seismic data as set forth in claim 14 which is further characterized to include the step of:

constraining event indications of the common depth point data trace groups such that only those event indications present on a predetermined number of adjacent data traces are acceptable for further processing in the step of summing said event indications, and limiting said further processing to said acceptable event indications.

16. In a method of velocity stacking multi-trace seismic information utilizing an automatic data processing system, a program to perform an operation wherein selected seismic trace indications are continuously summed to derive only primary event information, comprising the steps of:

dividing said multi-trace seismic information into plural trace groups of plural sequentially related channels, each trace group representing seismic trace information sequals as derived for a common depth point;

analyzing said information signals to determine velocities for seismic events occurring at greater than a selected amplitude on each channel of each common depth point trace group; and summing all event velocity determinations of each common depth point trace group relative to trace time to provide a multiple depth point output of selected event velocities versus time.

17. A method of velocity stacking as set forth in claim 16 which is further characterized by the step of:

performing velocity constraints on each common depth point trace group such that only those events having selected duration and velocities within a preselected range of velocities are subject to the step of determining velocities.

18. A method of velocity stacking as set forth in claim 16 wherein said step of determining comprises:

selecting events which occur on a predetermined number of adjacent ones of said common depth point trace groups;

further dividing said common depth point trace groups into a plurality of successive time-displaced trace groups; and comparing each of said selected seismic events which occur within approximately equal times for each trace group to establish velocities for all of said seismic events of each common depth point trace group.

19. A method of velocity stacking as set forth in claim 18 wherein said step of selecting comprises the steps of:

removing residual $\Delta t$ from respective traces of each common depth point trace group; and compositing each of said step-out removed traces such that said common depth point trace group is represented in vertical seismic signal travel time.

20. A method of velocity stacking as set forth in claim 16 which is further characterized to include steps of:

plotting each event relative to travel time as an impulse marking on one of a plurality of parallel lines, each parallel line representing the travel time scale for each common depth point trace group; and overlaying said plotted impulse indications with a graph of event velocities versus travel time, said overlaid travel time scale coinciding with said first plotted travel time scale.

* * * * *